Feb. 28, 1967  W. W. SCHROEDTER  3,306,587
APPARATUS FOR MIXING FLUIDS
Filed July 1, 1964  2 Sheets-Sheet 1

INVENTOR.
WILLBURT W. SCHROEDTER
BY
*Robert L. Olson*
ATTORNEY

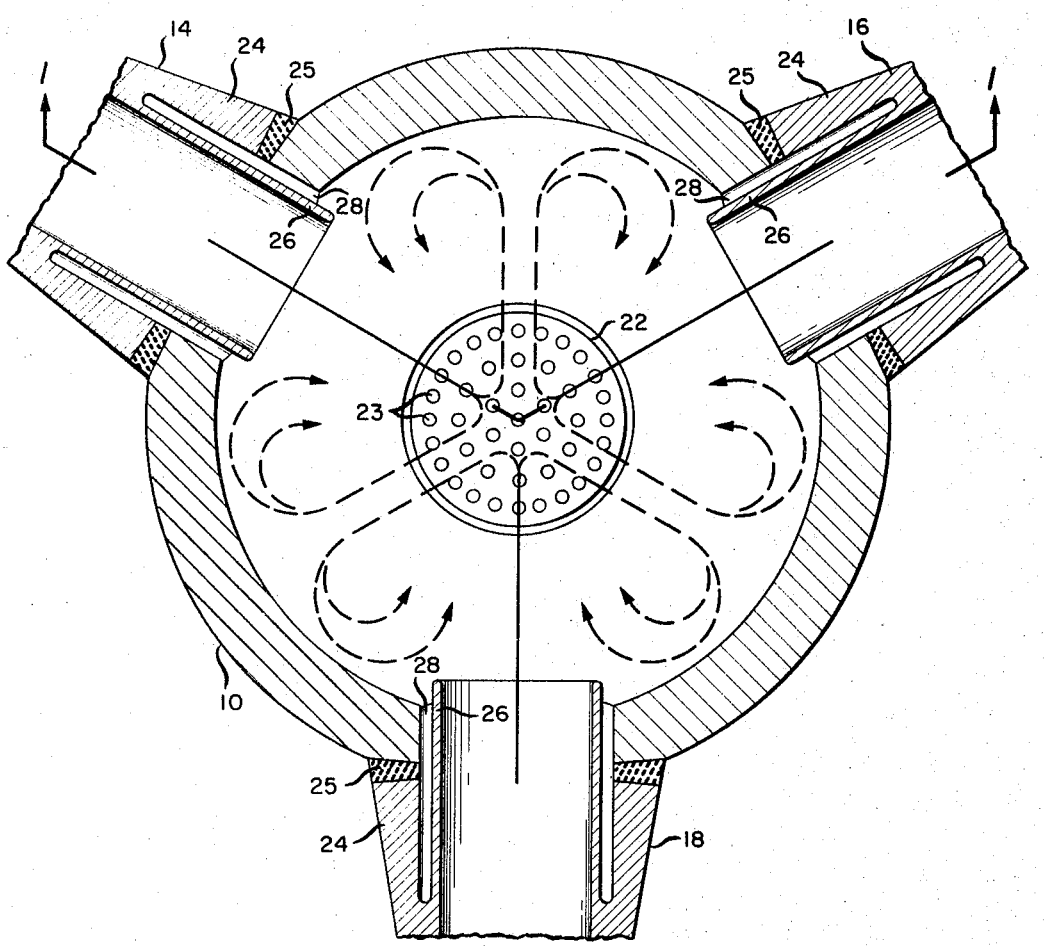

United States Patent Office 3,306,587
Patented Feb. 28, 1967

3,306,587
APPARATUS FOR MIXING FLUIDS
Willburt W. Schroedter, West Hartford, Conn., assignor to Combustion Engineering, Inc., Windsor, Conn., a corporation of Delaware
Filed July 1, 1964, Ser. No. 379,698
5 Claims. (Cl. 259—4)

This invention is related to a vessel for mixing two high pressure fluids together, which fluids are at substantially different temperatures.

An object of this invention is to provide a spherical mixing vessel whereby two high pressure fluids can be intimately and efficiently mixed, when said two fluids are at substantially different temperatures.

Other objects and advantages of the invention will become apparent from the following description when taken in conjunction with the accompanying drawings wherein:

FIG. 2 is a sectional plan view taken on line 2—2 of FIG. 1.

Figure 1:
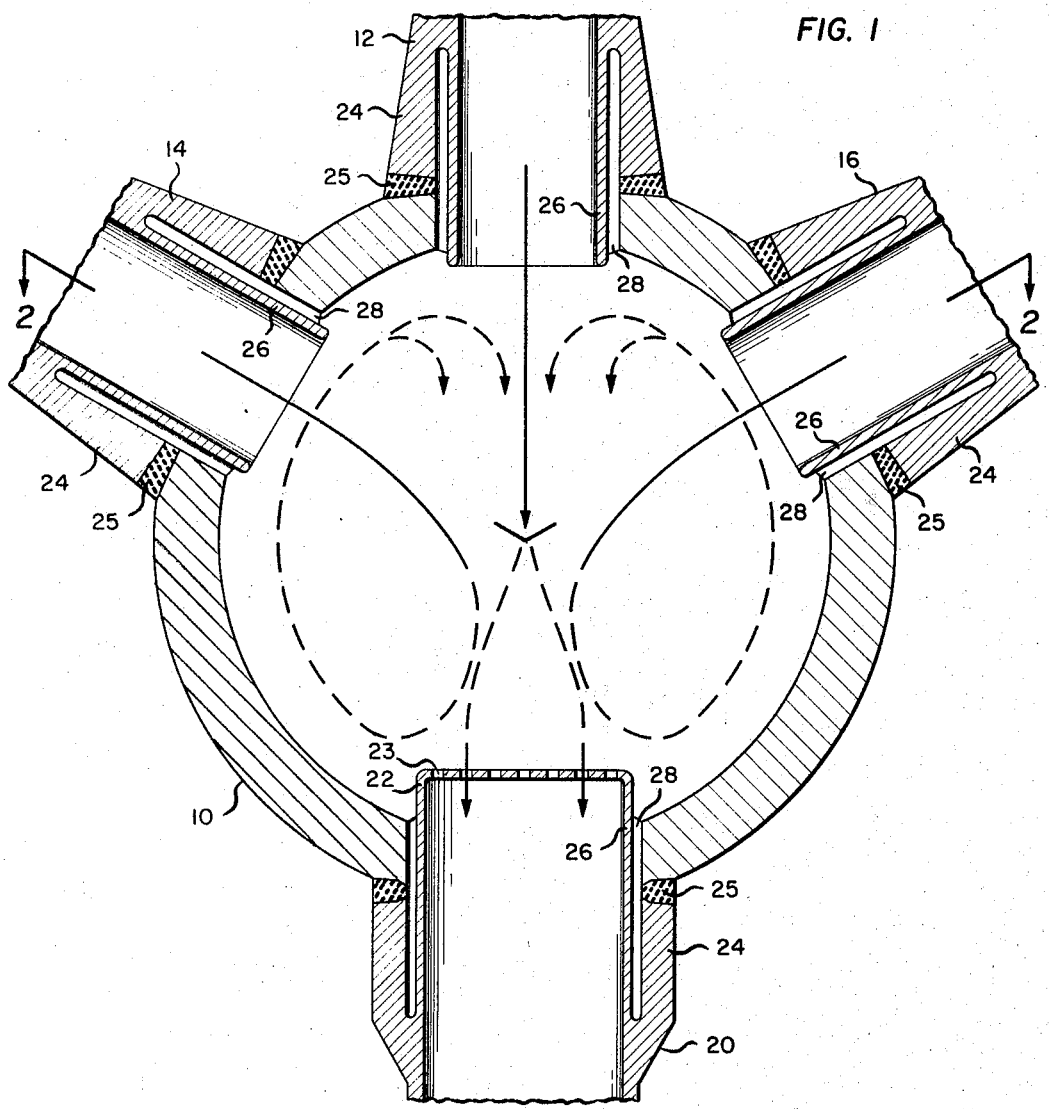
FIG. 1 is a sectional elevation of the mixing vessel of this invention taken on lines 1—1 of FIG. 2.

Looking now to FIG. 1, numeral 10 designates a heavy walled, spherical vessel in which two high pressure fluids at substantially different temperatures are to be mixed. Inlet line 12 is connected to the vessel so as to introduce the hottest of the two fluids into the vessel interior in a direction coinciding with the vertical axis of the vessel. Three equally spaced inlet lines 14, 16 and 18 (see FIG. 2) are radially connected to the vessel so as to direct streams of a relatively colder fluid towards the center of the vessel. The stream of hot fluid issuing from inlet line 12, after mixing with the streams of relatively cooler fluids coming from lines 14, 16 and 18, is discharged from the vessel by way of outlet 20, which outlet is diametrically opposed to the hot inlet line 12.

In the event that foreign objects might be carried into the mixing vessel along with the fluids, a strainer 22 having openings 23 therein is provided for the outlet line 20. This strainer will prevent any foreign objects from being carried along with the fluids into a pump or other piece of equipment positioned in the mixed outlet line, which could cause considerable damage.

All of the inlet and outlet lines have a thick walled outer sleeve 24 which is welded at 25 to the outer wall surface of the vessel housing. Each line also has a thin walled inner sleeve 26 which extends through the heavy wall of the vessel, to a point somewhat beyond the inner wall surface of the vessel. The annular space 28 thus formed between the two sleeves will fill with relatively stagnant water during operation, thus forming a thermal barrier for protecting both the vessel and the fluid lines against thermal stresses.

As best seen in FIG. 1, each of the inlet and outlet lines is radially connected to the mixing vessel. By this construction, the least possible amount of metal is removed from the vessel walls. Thus the greatest strength possible of the vessel wall is attained. Also the welding of the various lines to the vessel is made as simple as possible.

The flow patterns developed by the incoming streams of hot and cold fluids are shown by solid lines and dash lines in FIGS. 1 and 2. The solid lines illustrate the directions of flow of the streams issuing from the various inlet lines, and the dash lines indicate the direction of flow after all of the fluid streams have converged toward the center of the mixing vessel, and have been deflected therefrom.

As seen in FIG. 1, the streams of fluid after converging toward the vessel center, will be deflected downwardly and outwardly away therefrom. Some of these deflected streams will then encounter the vessel walls adjacent the outlet line 20, and will again be deflected, in an upward direction. Depending on the initial velocity of the streams, these upwardly deflected streams will continue moving in an upward direction along the inclined wall surface of the spherical housing until they encounter the stream of hot fluid issuing from inlet line 12.

Now looking at FIG. 2, it can be seen that the streams of fluid after converging toward the center of the vessel will not only be deflected in a downward direction, but will also be deflected in an outward, horizontal direction. The deflected streams will continue moving in an outward direction until they encounter the vessel walls, which will reverse their direction back towards the center of the vessel again. By this time the initial velocity of the incoming streams of fluid should be almost completely dissipated, and the fluid will move downwardly towards the outlet line 20.

Thus it can be seen that substantially the entire interior wall surface of the sphere will be continuously and evenly swept by fluids which have been intimately mixed, thereby maintaining the thermal stresses acting on the vessel walls at a minimum.

By utilizing three inlet lines for the relatively cooler fluid, it is possible to position these lines so that they are equally spaced, while still preventing any two streams from being diametrically opposed to each other. Such diametrically opposed introduction would result in dissipating almost all of the velocity of the streams when they meet at the center of the vessel, and would also result in fluctuating or uneven flow patterns within the vessel, which would be undesirable.

The mixing vessel of this invention has wide application. One example of use would be for mixing fluids at a steam generating site, where it is desired to mix a hot fluid with a relatively cooler fluid, and pump the resultant mixture to heat exchange surface within a boiler for further heating thereof. In such an installation, the fluid pressures are often in the range of 3500 to 5000 p.s.i. The hot fluid may be at a temperature of approximately 800° F., with the relatively cooler fluid being at approximately 400° F., with the temperatures of both fluids varying considerably over a given period of time. Thus it can be seen that a vessel capable of withstanding extremely high pressures must be provided; and the thermal stresses must be kept at a minimum. The above is readily accomplished by the mixing vessel of this invention.

While I have shown and described the preferred embodiment of the invention, it is to be understood that the invention is not limited thereto but may be otherwise variously embodied and practiced within the scope of the following claims.

What I claim is:

1. Apparatus for mixing high pressure fluids that are at substantially different temperatures, comprising a spherical housing, a first input line connected to the top of the spherical housing for introducing a stream of first fluid into the spherical housing interior in a direction coinciding with the vertical axis thereof, a plurality of second input lines connected to the spherical housing for introducing streams of a second fluid, which is at a substantially different temperature than the first fluid, into the spherical housing, said second input lines all being connected to the spherical housing in the same horizontal plane, and being equidistantly spaced, said second input lines being positioned such that the streams of second fluid form an acute angle with a horizontal plane passing through the center of the spherical housing, all of the second input lines being radially connected to the spherical housing so that all of the streams of second fluid intersect the first fluid stream at the center of the spherical housing, and an output line connected to the bottom of the spherical housing and being diametrically opposed to the first input line, through which the mixed fluid is discharged.

2. The apparatus set forth in claim 1, wherein there are three of the second input lines.

3. The apparatus set forth in claim 2 wherein the second input lines are connected to the spherical housing above a horizontal plane passing through the center of the spherical housing.

4. The apparatus set forth in claim 3, including a strainer positioned within the spherical housing which encloses the opening leading to the output line.

5. The apparatus set forth in claim 4, wherein the ends of each of the first input line, the output line, and all of the second input lines are of double sleeve construction, the outer sleeve being welded to the outer surface of the spherical housing wall, one end of the inner sleeve of which is connected to the outer sleeve at a location outside of the spherical housing, with the other end thereof extending through the wall of the spherical housing, so that a space is formed between the inner sleeve and the wall of the spherical housing in which relatively stagnant fluid stands, thus forming a thermal barrier.

References Cited by the Examiner

UNITED STATES PATENTS

| | | | |
|---|---|---|---|
| 154,544 | 9/1874 | Doten | 137—604 |
| 1,568,772 | 1/1926 | Rubin | 137—603 X |
| 1,986,225 | 1/1935 | Sefkin | 137—603 |

FOREIGN PATENTS 666,515  10/1938  Germany.

WALTER A. SCHEEL, *Primary Examiner.*

J. M. BELL, *Assistant Examiner.*